(12) United States Patent
Balmakhtar et al.

(10) Patent No.: US 12,619,773 B2
(45) Date of Patent: May 5, 2026

(54) FEDERATED TRANSACTIONS RECORD REPOSITORY AND ACCESS MANAGEMENT

(71) Applicant: T-Mobile Innovations LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 271 days.

(21) Appl. No.: 18/467,231

(22) Filed: Sep. 14, 2023

(65) Prior Publication Data

US 2025/0094624 A1 Mar. 20, 2025

(51) Int. Cl.
*G06F 21/60* (2013.01)
*G06F 21/62* (2013.01)

(52) U.S. Cl.
CPC ........ *G06F 21/6245* (2013.01); *G06F 21/604* (2013.01); *G06F 2221/2141* (2013.01)

(58) Field of Classification Search
CPC .............. G06F 21/6245; G06F 21/604; G06F 2221/2141
See application file for complete search history.

(56) References Cited

U.S. PATENT DOCUMENTS

| | | | |
|---|---|---|---|
| 2017/0078299 A1* | 3/2017 | Castinado | G06F 21/34 |
| 2021/0141853 A1* | 5/2021 | Whitney | G06F 16/986 |
| 2021/0157783 A1* | 5/2021 | Shrinivasan | G06F 16/2365 |
| 2021/0352142 A1* | 11/2021 | Jayaram | G06Q 20/26 |

FOREIGN PATENT DOCUMENTS

| | | | | |
|---|---|---|---|---|
| EP | 3985586 A1 * | 4/2022 | | H04L 9/3213 |

* cited by examiner

*Primary Examiner* — Andrew Suh

(57) ABSTRACT

A method of storing and managing access to information about electronic transactions completed by users collected from a plurality of transaction processors. The method comprises storing information associated with transactions by an application; receiving a first user information management request by the application from a user; sending a user management report by the application to the user; receiving a second user information management request message by the transaction record repository application from the user; and responsive to receiving the second user information management request message, restricting access by the application to one or more of the types of information on electronic transactions associated with the user that can be accessed by one or more of the transaction processors.

20 Claims, 11 Drawing Sheets

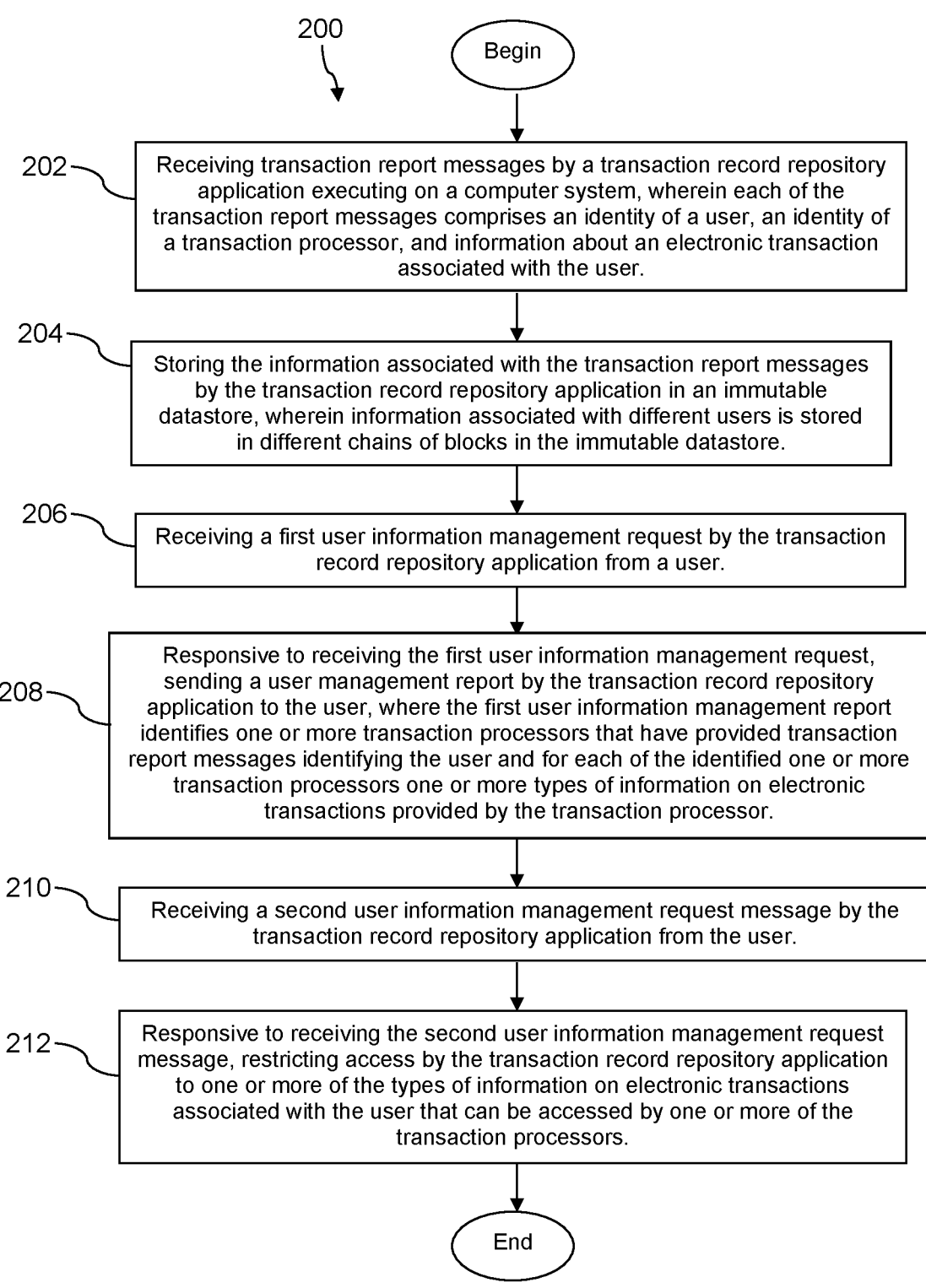

*200*

Begin

202 — Receiving transaction report messages by a transaction record repository application executing on a computer system, wherein each of the transaction report messages comprises an identity of a user, an identity of a transaction processor, and information about an electronic transaction associated with the user.

204 — Storing the information associated with the transaction report messages by the transaction record repository application in an immutable datastore, wherein information associated with different users is stored in different chains of blocks in the immutable datastore.

206 — Receiving a first user information management request by the transaction record repository application from a user.

208 — Responsive to receiving the first user information management request, sending a user management report by the transaction record repository application to the user, where the first user information management report identifies one or more transaction processors that have provided transaction report messages identifying the user and for each of the identified one or more transaction processors one or more types of information on electronic transactions provided by the transaction processor.

210 — Receiving a second user information management request message by the transaction record repository application from the user.

212 — Responsive to receiving the second user information management request message, restricting access by the transaction record repository application to one or more of the types of information on electronic transactions associated with the user that can be accessed by one or more of the transaction processors.

End

FIG. 3

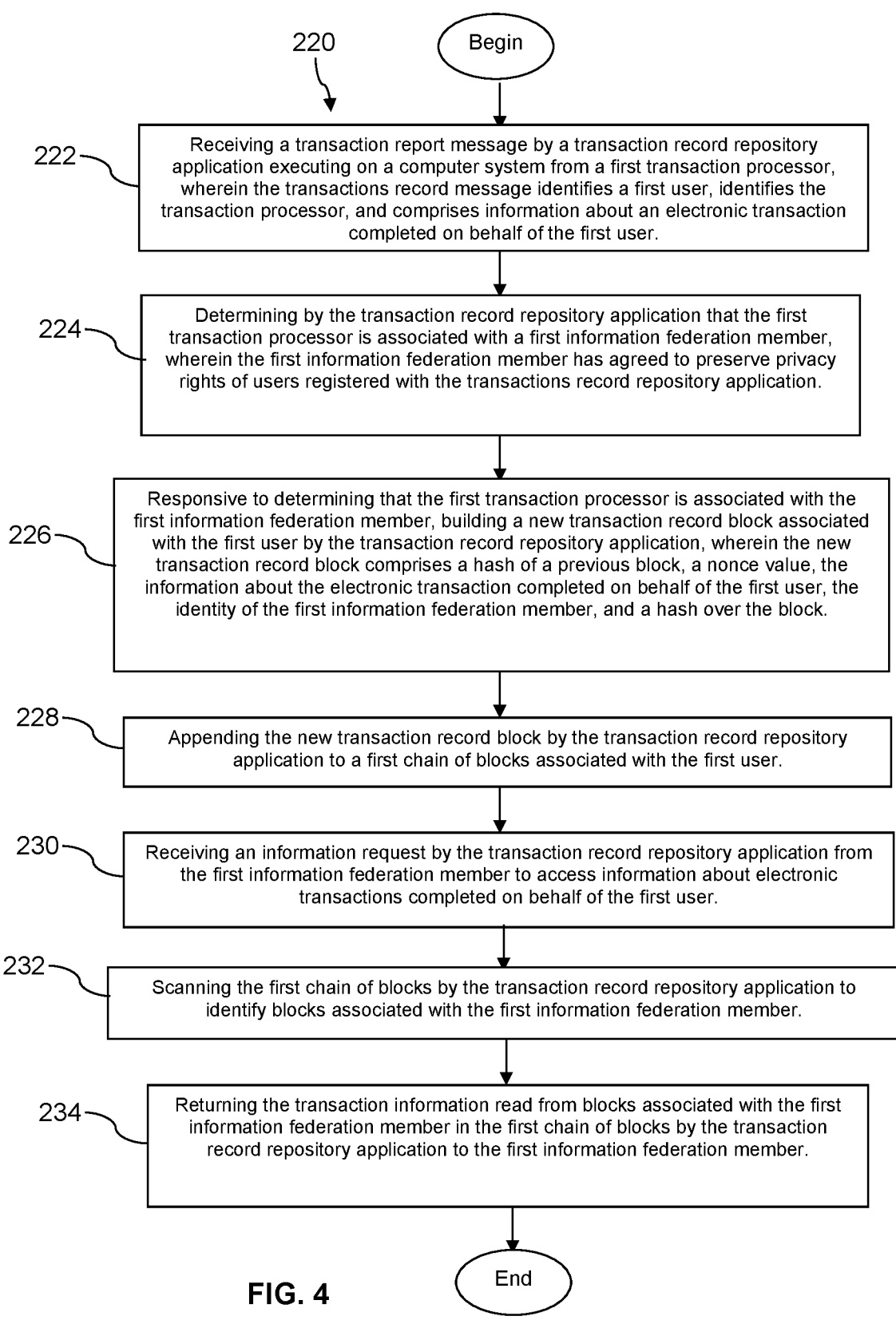

220

Begin

222 — Receiving a transaction report message by a transaction record repository application executing on a computer system from a first transaction processor, wherein the transactions record message identifies a first user, identifies the transaction processor, and comprises information about an electronic transaction completed on behalf of the first user.

224 — Determining by the transaction record repository application that the first transaction processor is associated with a first information federation member, wherein the first information federation member has agreed to preserve privacy rights of users registered with the transactions record repository application.

226 — Responsive to determining that the first transaction processor is associated with the first information federation member, building a new transaction record block associated with the first user by the transaction record repository application, wherein the new transaction record block comprises a hash of a previous block, a nonce value, the information about the electronic transaction completed on behalf of the first user, the identity of the first information federation member, and a hash over the block.

228 — Appending the new transaction record block by the transaction record repository application to a first chain of blocks associated with the first user.

230 — Receiving an information request by the transaction record repository application from the first information federation member to access information about electronic transactions completed on behalf of the first user.

232 — Scanning the first chain of blocks by the transaction record repository application to identify blocks associated with the first information federation member.

234 — Returning the transaction information read from blocks associated with the first information federation member in the first chain of blocks by the transaction record repository application to the first information federation member.

End

App 1          App 2          App 3

Browser        Phone          Camera

FEDERATED TRANSACTIONS RECORD REPOSITORY AND ACCESS MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users may browse content and shop for goods and services via the Internet using browsers hosted on user devices such as laptop computers, tablet computers, smart phones, and other consumer electronic devices. HTTP cookies may be deposited on user devices by web sites to support stateful transaction sessions.

SUMMARY

In an embodiment, a system for storing and managing access to information about electronic transactions completed by users collected from a plurality of different transaction processors is disclosed. The system comprises a processor; a non-transitory memory; a data store comprising a repository of information on user electronic transactions, wherein the repository comprises a chain of user blocks and a plurality of user electronic transaction chains, wherein each user block has a content that comprises a reference to an initial block of one of the user electronic transaction chains, and wherein each user electronic transaction chain comprises one or more user electronic transaction blocks associated with a user identified in the user block that references the electronic transaction chain; and a transaction record repository application stored in the non-transitory memory. When executed by the processor, the transaction record repository application receives transaction report messages from transaction processors that comprise an identity of a user, an identity of a transaction processor, and information about one or more electronic transactions completed by the transaction processor on behalf of the user and creates user transaction blocks based on the transaction report messages received from transaction processors, wherein each user transaction block identifies a transaction processor and comprises information about one or more electronic transactions completed by the identified transaction processor on behalf of the user. The transaction record repository application further appends the user transaction blocks to an associated user chain; receives user information management request messages from users that define user transaction information access rules for transaction processors; and responds to information requests from transaction processors by returning information retrieved from the data store based on the access rules defined by the user management order messages.

In another embodiment, a method of storing and managing access to information about electronic transactions completed by users collected from a plurality of transaction processors. The method comprises receiving transaction report messages by a transaction record repository application executing on a computer system, wherein each of the transaction report messages comprises an identity of a user, an identity of a transaction processor, and information about an electronic transaction associated with the user, storing the information associated with the transaction report messages by the transaction record repository application in an immutable datastore, wherein information associated with different users is stored in different chains of blocks in the immutable data, and receiving a first user information management request by the transaction record repository application from a user. The method further comprises, responsive to receiving the first user information management request, sending a user management report by the transaction record repository application to the user, where the user information management report identifies one or more transaction processors that have provided transaction report messages identifying the user and for each of the identified one or more transaction processors one or more types of information on electronic transactions provided by the transaction processor; receiving a second user information management request message by the transaction record repository application from the user; and, responsive to receiving the second user information management request message, restricting access by the transaction record repository application to one or more of the types of information on electronic transactions associated with the user that can be accessed by one or more of the transaction processors In yet another embodiment, a method of storing and managing access to information about electronic transactions completed by users collected from a plurality of transaction processors is disclosed. The method comprises receiving a transaction report message by a transaction record repository application executing on a computer system from a first transaction processor, wherein the transaction report message identifies a first user, identifies the transaction processor, and comprises information about an electronic transaction completed on behalf of the first user; determining by the transaction record repository application that the first transaction processor is associated with a first information federation member, wherein the first information federation member has agreed to preserve privacy rights of users registered with the transactions record repository application; and responsive to determining that the first transaction processor is associated with the first information federation member, building a new transaction record block associated with the first user by the transaction record repository application, wherein the new transaction record block comprises a hash of a previous block, a nonce value, the information about the electronic transaction completed on behalf of the first user, the identity of the first information federation member, and a hash over the block. The method further comprises appending the new transaction record block by the transaction record repository application to a first chain of blocks associated with the first user; receiving an information request by the transaction record repository application from the first information federation member to access information about electronic transactions completed on behalf of the first user; scanning the first chain of blocks by the transaction record repository application to identify blocks associated with the first information federation member; and returning the transaction information read from blocks associated with the first information federation member in the first chain of blocks by the transaction record repository application to the first information federation member.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of a method according to an embodiment of the disclosure.

FIG. 4 is a flow chart of another method according to an embodiment of the disclosure.

DETAILED DESCRIPTION

Figure 1:
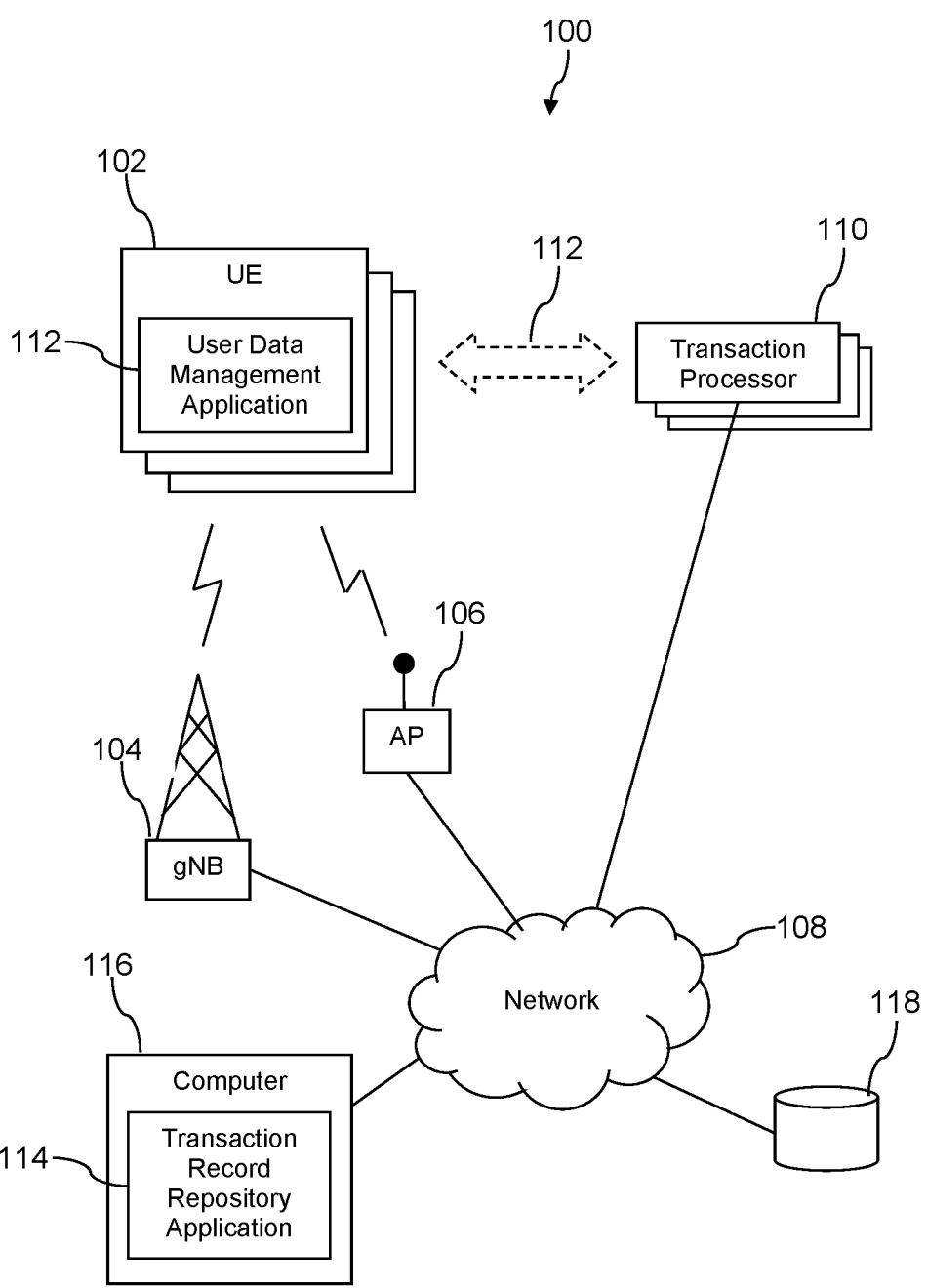
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches establishing a repository of information on user electronic transactions based on transaction reports received from different electronic transaction processors, such as content web sites, electronic retail sales web sites, social networking web sites, gaming web sites, and other web sites. This repository can be used by electronic transaction processors and/or marketing entities as a replacement for or a complement to the existing HTTP cookie paradigm (e.g., Internet cookies, web cookies, or browser cookies). Cookies are stored on user devices by web servers and by other devices external to the user devices. In an embodiment, the repository can also be used as a replacement for or a complement to the existing application cookie paradigm (e.g., mobile applications interacting with services and/or application servers may likewise be sent cookies from the services and/or application servers that are similar, at least in purpose, to HTTP cookies sent by web sites). While cookies may serve useful purposes, they can also present security risks to user devices and to user confidential information.

The user transaction information repository disclosed herein is managed by a transaction record repository application (hereinafter the repository application) that receives information from collaborating partners on user electronic transactions. The collaborating partners may be referred to as user information federation members in some contexts. Collaborating partners agree to information sharing rules promulgated by the operator of the repository application. The repository application provides an application programming interface (API) or a web site that users can use to define rules for information federation members to access information about their electronic transactions, to review their previously defined rules, and to review information about their transactions stored in the transaction information repository. Unlike cookies, the information about user electronic transactions is stored in the datastore managed by the repository application and is not stored on the user devices.

In an embodiment, the user electronic transaction information is stored in an immutable data structure, for example in a hyperledger data structure or in a block chain data structure. As used herein, the term "immutable" means that the data cannot be changed without leaving evidence of the data having been changed (e.g., hash values in later blocks that are inconsistent with hash values and content in earlier blocks) or without a large-scale effort to reduplicate an entire data structure from scratch. In an embodiment, the user information repository comprises a user data structure that comprises a plurality of blocks, where each block (excepting an initial block) identifies a user, a chain of user transaction information associated with the identified user, and a set of user information access rules associated with that user. Each chain of user transaction information comprises a plurality of blocks, where each block (excepting an initial block) identifies a transaction processor and one or more items of electronic transaction information.

The transaction information stored in the blocks of the user transaction information chains may contain a variety of information on one or more transactions completed by the associated user. The information may comprise a date and time of an electronic transaction. The information may comprise a dollar amount of the electronic transaction. The information may identify an expenditure range rather than an explicit dollar amount, for example less than $20, more than $20 and less than $50, more than $50 and less than $100, and more than $100, or some other stratification of expenditure. The information may comprise an identity of a product or service category. The information may comprise information about how the user navigated to a web site, for example by clicking on an ad while playing a video game or clicking on an ad while visiting a social networking web site. The information may comprise information about a latest state of a user session with an electronic commerce application, for example a status of an electronic shopping cart and/or a status of a shipping address definition, whereby to support a multi-step electronic purchase.

The rules defined by users may restrict access to transaction information associated with them to the transaction processor that initially generated the transaction information and transmitted it to the repository application. The rules defined by users may allow access to other collaborating partners for some types of transaction information and not to other types of transaction information.

Turning now to FIG. 1, a system 100 is described. In an embodiment, the system 100 comprises a user equipment (UE) 102 that communicates via a wireless communication link provided by a cell site 104 or by a WiFi access point (AP) 106 to a network 108 and via the network 108 to a transaction processor 110. The user of the UE 102 may navigate to a web site associated with the transaction processor 110 to complete a transaction session represented abstractly by dotted line arrow 112 in FIG. 1. The transaction processors 110 may comprise content web sites, electronic retail sales web sites, social network web sites, gaming web sites, and other web sites.

The UE 102 may be a smart phone, a wearable computer, a laptop computer, a tablet computer, or a notebook computer. The network 108 comprises one or more public networks, one or more private networks, or a combination thereof. The cell site 104 is able to provide a wireless communication link to the UE 102 according to a 5G, a long-term evolution (LTE), a code division multiple access (CDMA), or a global system for mobile communication (GSM) telecommunication protocol. The transaction processor 110 may be an electronic commerce web site, a content streaming web site, a gaming web site, or other web site. It will be appreciated that the system 100 may comprise any number of UEs 102, any number of cell sites 104, any number of WiFi APs 106, and any number of transaction processors 110. It is understood that the UEs 102 may include any mix of different types of UEs: for example, a mix of different smart phones, different laptops, different notebooks, and different tablets.

A transaction processor 110 may capture information about a user communication session with a web site and send that information in one or more transaction report messages to a transaction record repository application 114 executing on a computer system 116. The information about the user communication session may include information about electronic transactions completed by users (e.g., by UEs 102 employed by users to conduct the communication session) such as purchases, downloads of content, postings to a social networking web site, and other actions. A transaction report message may comprise an identity of the transaction processor 110 or an enterprise that owns and operates the transaction processor 110. The transaction report message may comprise an identity of the UE 102 and/or an identity of the user associated with the UE 102. In another embodiment, however, the transaction report message does not have an identity of the UE 102 or of the user. In an embodiment, the transaction report message has an anonymized identity that associates to the UE 102 or to the user but cannot be mapped to an actual name of the UE 102 or to an actual name of the user, whereby to protect the privacy of the user. The transaction report message comprises information about one or more transactions or messages exchanged between the UE 102 and the transaction processor 110. The information may comprise a state of a transaction. The information may comprise information about a completed transaction such as a purchase transaction. The information may identity a dollar amount of a transaction and a product or service that was purchased. In an embodiment, the information may identify not a specific dollar amount but a category or bin of dollar expenditure. For example, the information may identify that the purchase was in the range of 0 to $20, in the range of more than $20 to $50, in the range of more than $50 to $100, or in the range of more $100. It is understood that any definition of purchase price bins may be defined for the transaction report messages.

The transaction information provided by the transaction processors 110 can be stored by the transaction record repository application 114 in a data store 118. The storing of the transaction information in the data store 118 may provide a viable alternative to storing the transaction information as HTML cookies on the UEs 102. The transaction record repository application 114 can mediate access of the transaction processors 110 to the transaction information stored in the data store 118. It is contemplated that different transaction processors 110 and/or the enterprises that own and operate the transaction processors 110 may be members of an information federation where transaction information may be shared among the members in a controlled way mediated by the transaction record repository application 114 based on information access rules defined by the users of the UEs 102. This system can provide greater user control of their information and, where users permit, broader access to the user transaction information. For example, in the current HTML cookie paradigm, transaction information is only accessible to the transaction processor involved in creation of the given cookie and not accessible to other unrelated transaction processors. Here, by contrast, if a user consents (by defining an access rule to this effect), transaction information can be shared by other transaction processors not involved in the user transaction. In an embodiment, users may be provided incentives for consenting to share the user transaction information with other transaction processors participating in the information federation. In an embodiment, users may define access rules that forbid access to information after it has exceeded an age threshold, for example an age threshold of a day, an age threshold of two days, an age threshold of three days, an age threshold of a week, an age threshold of ten days, an age threshold of two weeks, an age threshold of a month, an age threshold of three months, an age threshold of six months, or some other age limit.

Figure 2A:
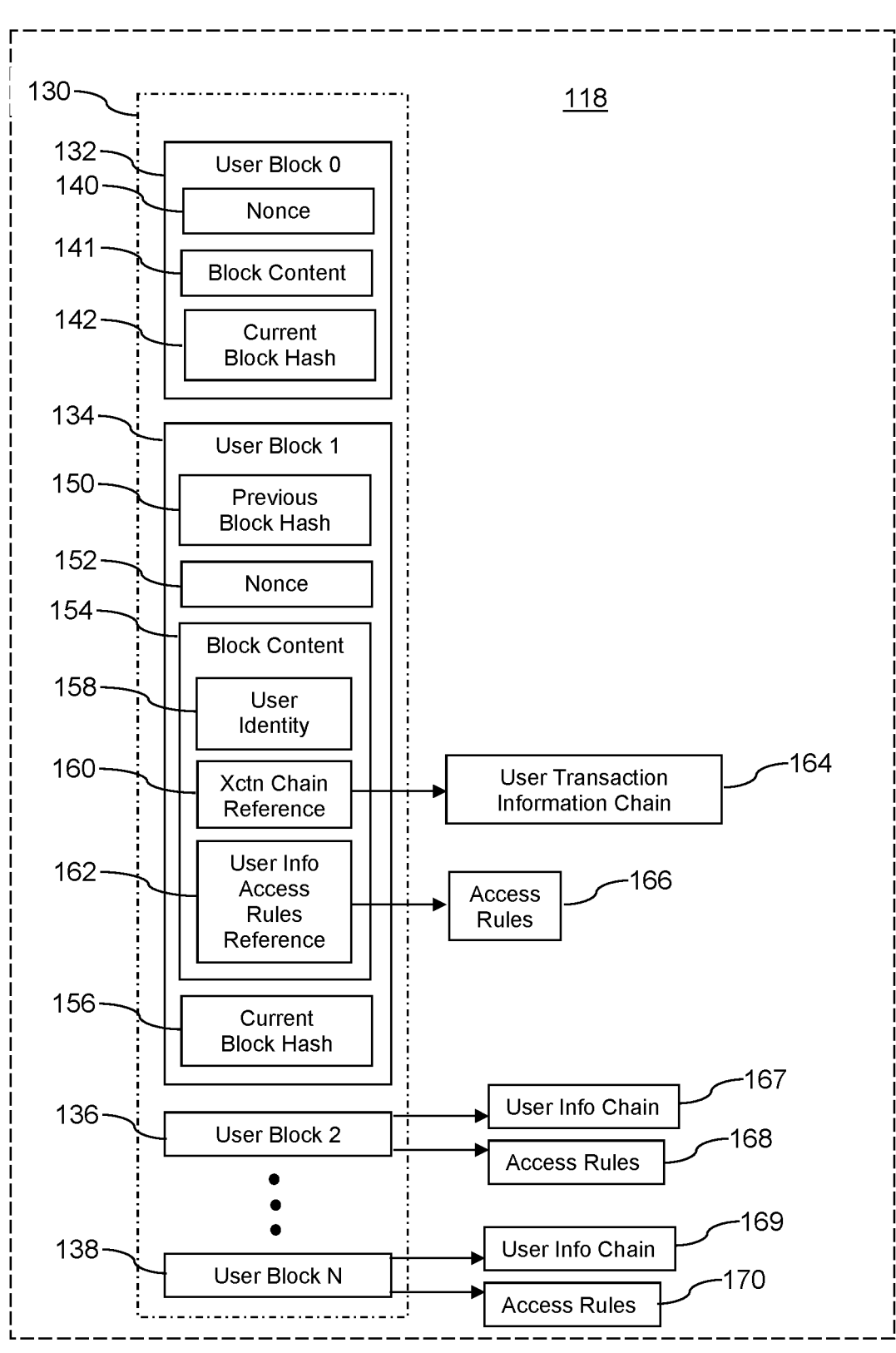
FIG. 2A and FIG. 2B are a block diagram of a data store according to an embodiment of the disclosure.
Figure 2B:
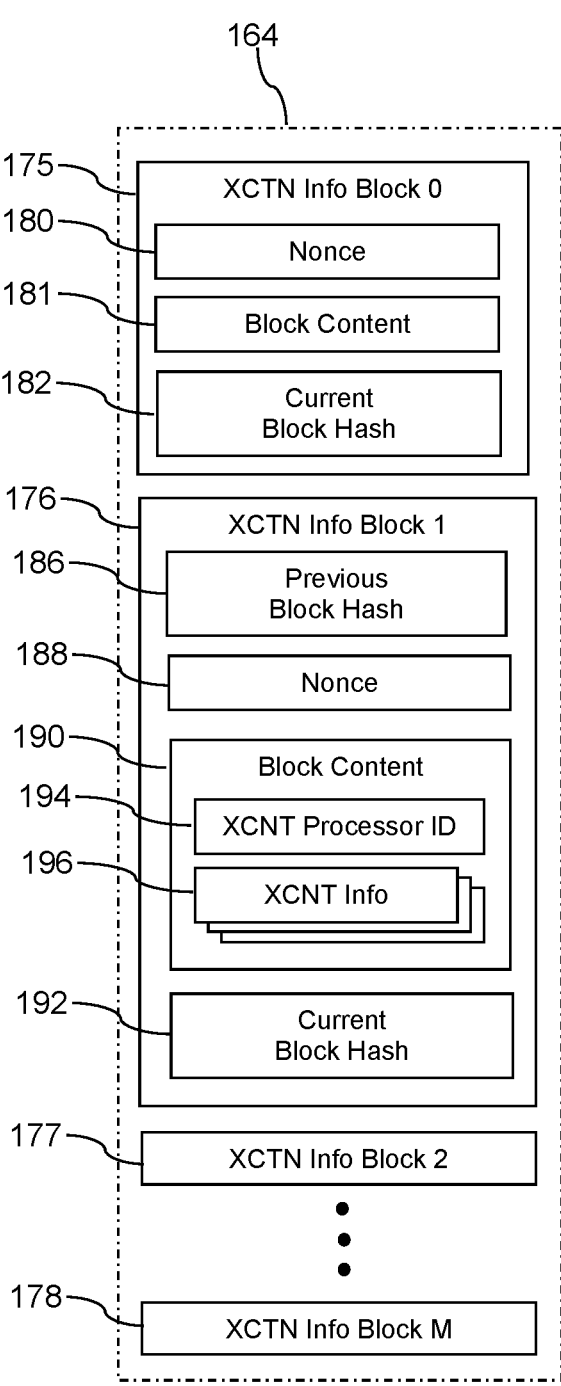

Turning now to FIG. 2A and FIG. 2B, further details of the data store 118 are described. It will be appreciated that in different embodiments, different data structures may be used by the transaction record repository application 114 to store the transaction information provided via the transaction report messages in the data store 118. In an embodiment, the data store 118 comprises a chain of user blocks 130 that comprise a plurality of blocks chained together. An initial user block 132 (e.g., user block 0) comprises a nonce 140, a block content 141, and a current block hash 142 over the nonce 140 and the block content 141. The nonce 140 contains a value that is a random or pseudorandom number and may be selected such that the current block hash 142 satisfies a criteria (e.g., the criteria may be that the four leading digits of the value of the current block hash 142 are zeros). The block content 141 may provide information and/or smart contract information related to the chain of user blocks 130 as a whole. The other blocks on the chain of user blocks 130 are logically sequential to each other and are logically linked to each other (e.g., a first block points to a second block, the second block points to a third block, etc., to the last block on the chain, and the last block may point to the next to the last block, a fourth block may point to the third block, the third block may point to the second block, the second block may point to the first block, and the first block may point to the initial block 132).

In an embodiment, the chain of user blocks 130 comprises a first user block 134, a second user block 136, and a third user block 138 (e.g., an "N-th" user block N). While FIG. 2A illustrates the chain of user blocks 130 comprising three user blocks (disregarding the initial user block 132), it will be appreciated that the chain of user blocks 130 may comprise any number of user blocks. The first user block 134 may be associated with transactions initiated by a first user, the second user block 136 may be associated with transactions initiated by a second user, and the third user block 138 may be associated with transactions initiated by a third user.

The first user block 134 comprises a previous block hash 150 (e.g., the current block hash of the preceding block), a nonce 152, a block content 154, and a current block hash 156 (e.g., a hash value calculated over the previous block hash 150, over the nonce 152, and over the block content 154). The nonce 152 may be a random or pseudorandom number that is chosen such that the value of the current block hash 156 satisfies a criteria. In an embodiment, the block content 154 comprises a user identity 158, a transaction chain reference 160, and a user information access rule reference 162. The user identity 158 identifies the user associated with one or more transactions identified in one or more transaction report messages. The user identity 158 may be a mobile station international subscriber directory number (MSISDN), a mobile equipment identifier (MEID), international mobile subscriber identity (IMSI), a subscriber permanent identity (SUPI), a subscription concealed identifier (SUCI), or some other identity. The user identity 158 may be an anonymized identity that does not allow linking the anonymized identity to any particular UE 102 or any particular individual.

The transaction chain reference 160 identifies or points to a user transaction information chain 164 that contains information of different transactions associated with a first user identified by the user identity 158. The user information access rules reference 162 identifies or points to one or more access rules 166 defined by the user identified by the user identity 158. The second user block 136 and third user block 138 have a structure similar to the structure of the first user block 134. The second user block 136 may have a transaction chain reference that identifies a second user transaction information chain 167 that contains information of different transactions associated with a second user (identified by the user identity of the second user block 136) and a user information access rules reference that identifies a second access rules 168 (defined by the second user). The third user block 138 may have a transaction chain reference that identifies a third user transaction information chain 169 that contains information of yet different transactions associated with a third user (identified by the user identity of the third user block 138) and a user information access rules reference that identifies a third access rules 170 (defined by the third user).

In an embodiment, the first user transaction information chain 164 comprises an initial transaction block 175, a first transaction block 176, a second transaction block 177, and a third transaction block 178. While FIG. 2B illustrates the first user transaction information chain 164 as comprising three transaction blocks (disregarding the initial transaction block 175), it will be appreciated that the first user transaction information chain 164 may comprise any number of transaction blocks. The initial transaction block 175 comprises a nonce 180, a block content 181, and a current block hash taken over the initial transaction block 175 and the nonce 180. The nonce 180 is a random or pseudorandom number. The nonce 180 may be selected such that the current block hash 182 satisfies a criteria. The block content 181 may provide information and/or smart contract information related to the first user transaction information chain 164. The other blocks on the chain of the first user transaction information chain 164 are logically sequential to each other and are logically linked to each other.

The first transaction block 176 comprises a previous block hash 186 (e.g., the current block has of the preceding transaction block), a nonce 188, a block content 190, and a current block hash 192 (e.g., a hash value calculated over the previous block hash 186, over the nonce 188, and over the block content 190). The nonce 188 is a random or pseudorandom number. The nonce 188 may be chosen such that the value of the current block hash 192 satisfies a criteria. The block content 190 may comprise a transaction processor identity 194 and one or more items of transaction information 196. The transaction processor identity 194 may identify one of the transaction processors 110, a web site associated with the transaction processor 110, or an operator of the transaction processor 110.

The transaction information 196 may contain a variety of information on one or more transactions completed by the UE 102 and/or the associated user. The information may comprise a date and time of an electronic transaction. The information may comprise a dollar amount of the electronic transaction. The information may identify an expenditure range rather than an explicit dollar amount, for example less than $20, more than $20 and less than $50, more than $50 and less than $100, and more than $100, or some other stratification of expenditure. The information may comprise an identity of a product or service category. The information may comprise information about how the UE 102 navigated to a web site, for example by clicking on an ad while playing a video game or clicking on an ad while visiting a social networking web site. The information may comprise information about a latest state of a user session of the UE 102 with an electronic commerce application, for example a status of an electronic shopping cart and/or a status of a shipping address definition, whereby to support a multi-step electronic purchase.

The block content 190 may contain a plurality of transaction information 196 bundles, whereby to efficiently store information on a plurality of transactions completed by the UE 102 with the same transaction processor 110 in a single transaction block. The other transaction blocks 177, 178 may comprise a structure like the first transaction block 176 described in detail above.

Turning now to FIG. 3, a method 200 is described. In an embodiment, the method 200 is a method of storing and managing access to information about electronic transactions completed by users collected from a plurality of transaction processors. In an embodiment, the electronic transactions completed by users are completed via user equipments (UEs). At block 202, the method 200 comprises receiving transaction report messages by a transaction record repository application executing on a computer system, wherein each of the transaction report messages comprises an identity of a user, an identity of a transaction processor, and information about an electronic transaction associated with the user. In an embodiment, at least some of the transaction report messages comprise information about how a user (or a UE employed by a user) navigated to a web site. In an embodiment, at least some of the transaction report messages comprise information about a product or a service category.

At block 204, the method 200 comprises storing the information associated with the transaction report messages by the transaction record repository application in an immutable datastore, wherein information associated with different users is stored in different chains of blocks in the immutable datastore. At block 206, the method 200 comprises receiving a first user information management request by the transaction record repository application from a user.

At block 208, the method 200 comprises, responsive to receiving the first user information management request, sending a user management report by the transaction record repository application to the user, where the user information management report identifies one or more transaction processors that have provided transaction report messages identifying the user and for each of the identified one or more transaction processors one or more types of information on electronic transactions provided by the transaction processor. In an embodiment, at least one transaction processor is associated with a content web site. In an embodiment, at least one transaction processor is associated with a social network web site. In an embodiment, at least one transaction processor is associated with an electronic retail sales web site. In an embodiment, at least one transaction processor is associated with a gaming web site.

At block 210, the method 200 comprises receiving a second user information management request message by the transaction record repository application from the user. At block 212, the method 200 comprises, responsive to receiving the second user information management request message, restricting access by the transaction record repository application to one or more of the types of information on electronic transactions associated with the user that can be accessed by one or more of the transaction processors.

Turning now to FIG. 4, a method 220 is described. In an embodiment, the method 220 is a method of storing and managing access to information about electronic transactions completed by users collected from a plurality of transaction processors. In an embodiment, at least some of the electronic transactions completed by users are completed via smart phones. In an embodiment, at least some of the electronic transactions complete by users are completed vi laptop computers. In an embodiment, at least some of the electronic transactions completed by users are completed via notebook computers or tablet computers.

At block 222, the method 220 comprises receiving a transaction report message by a transaction record repository application executing on a computer system from a first transaction processor, wherein the transactions report message identifies a first user, identifies the transaction processor, and comprises information about an electronic transaction completed on behalf of the first user. In an embodiment, the first transaction processor is associated with a content web site, a social network web site, an electronic retail sales web site, or a gaming web site. In an embodiment, the transaction report message comprises information about how the first user navigated to a web site. In an embodiment, the first transaction processor is associated with a content application, a social network application, an electronic retail sales application, or a gaming application. In an embodiment, the transaction report message comprises information about how the first user navigated to the application. The application (e.g., the content application, the social network application, the electronic retail sales application, and/or the gaming application) may be a mobile application that is installed on the UE and may communicate with a corresponding service or server application via the network. Alternatively, the application may be an application installed on a stationary UE, for example in a desktop computer.

At block 224, the method 220 comprises determining by the transaction record repository application that the first transaction processor is associated with a first information federation member, wherein the first information federation member has agreed to preserve privacy rights of users registered with the transactions record repository application. At block 226, the method 220 comprises, responsive to determining that the first transaction processor is associated with the first information federation member, building a new transaction record block associated with the first user by the transaction record repository application, wherein the new transaction record block comprises a hash of a previous block, a nonce value, the information about the electronic transaction completed on behalf of the first user, the identity of the first information federation member, and a hash over the block.

At block 228, the method 220 comprises appending the new transaction record block by the transaction record repository application to a first chain of blocks associated with the first user. At block 230, the method 220 comprises receiving an information request by the transaction record repository application from the first information federation member to access information about electronic transactions completed on behalf of the first user.

At block 232, the method 220 comprises scanning the first chain of blocks by the transaction record repository application to identify blocks associated with the first information federation member. At block 234, the method 220 comprises returning the transaction information read from blocks associated with the first information federation member in the first chain of blocks by the transaction record repository application to the first information federation member.

Figure 5:
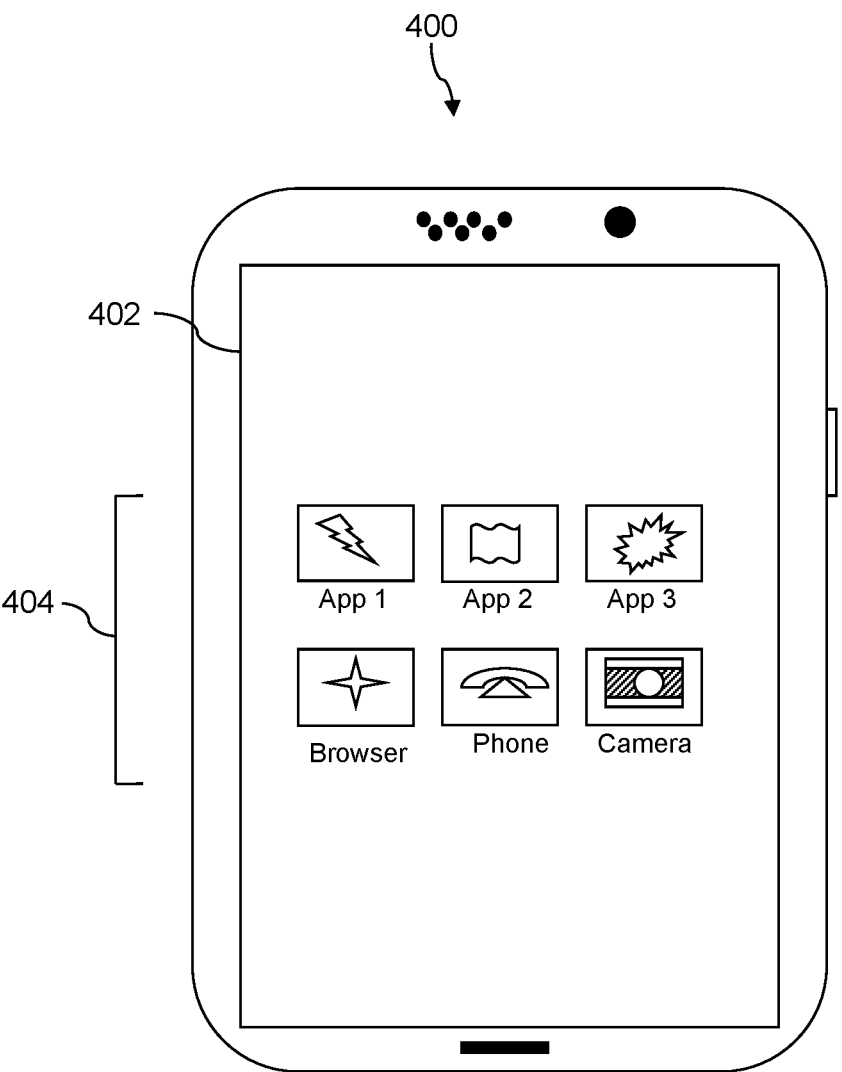
FIG. 5 is an illustration of a handset according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
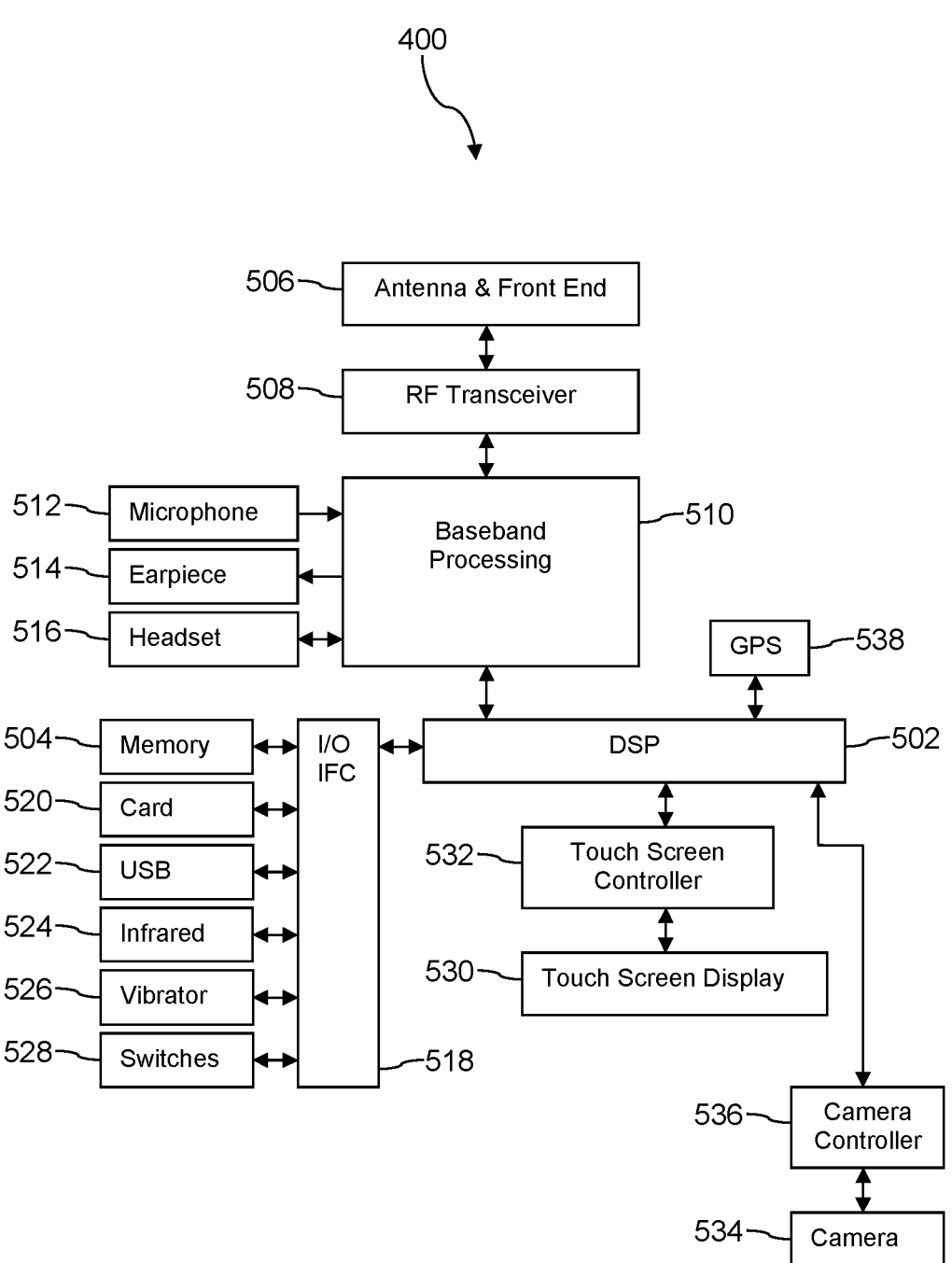
FIG. 6 is a block diagram of a user equipment (UE) according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long-term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
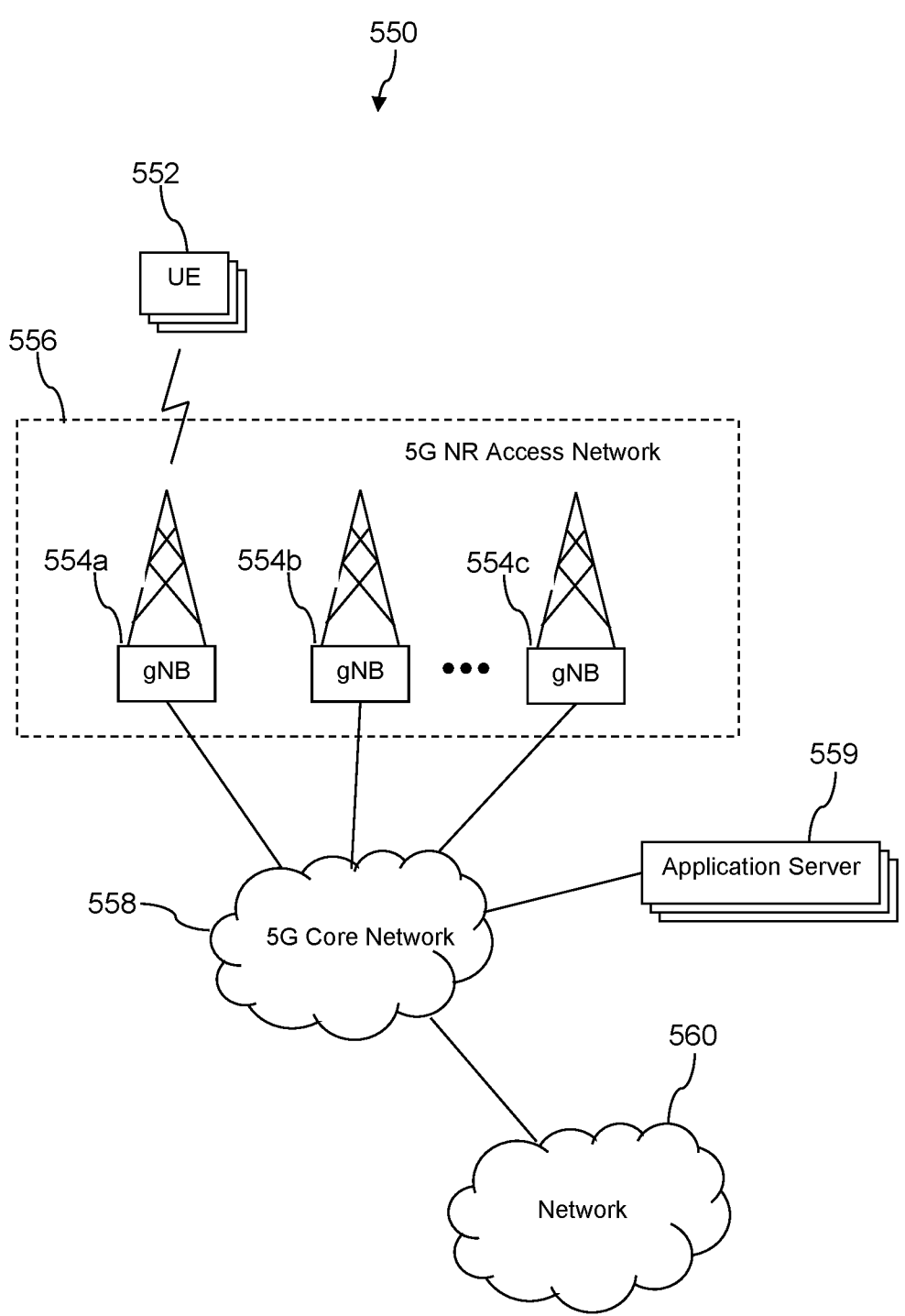
FIG. 7A and FIG. 7B are a block diagram of a network according to an embodiment of the disclosure.

Turning now to FIG. 7A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
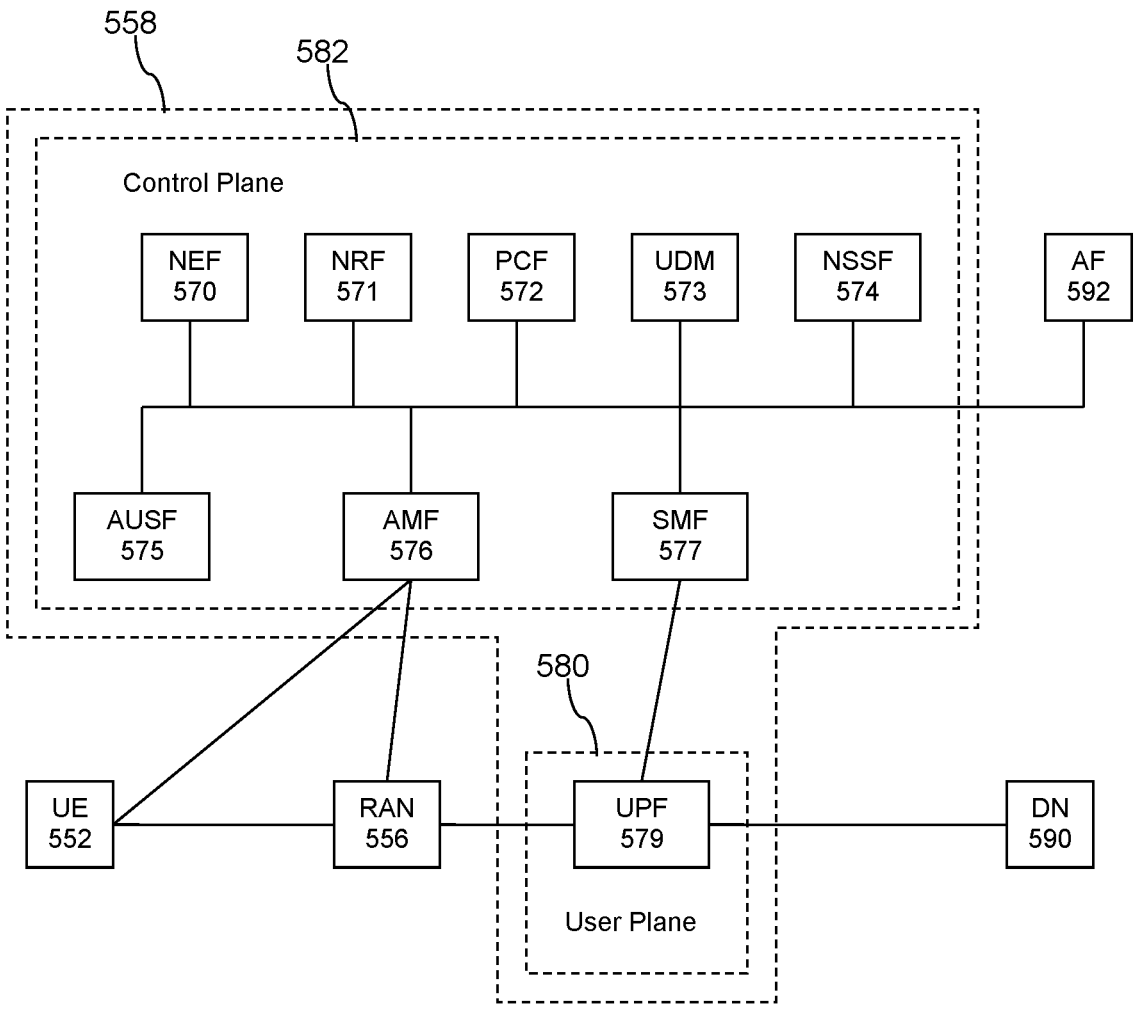

Turning now to FIG. 7B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 7A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 8A:
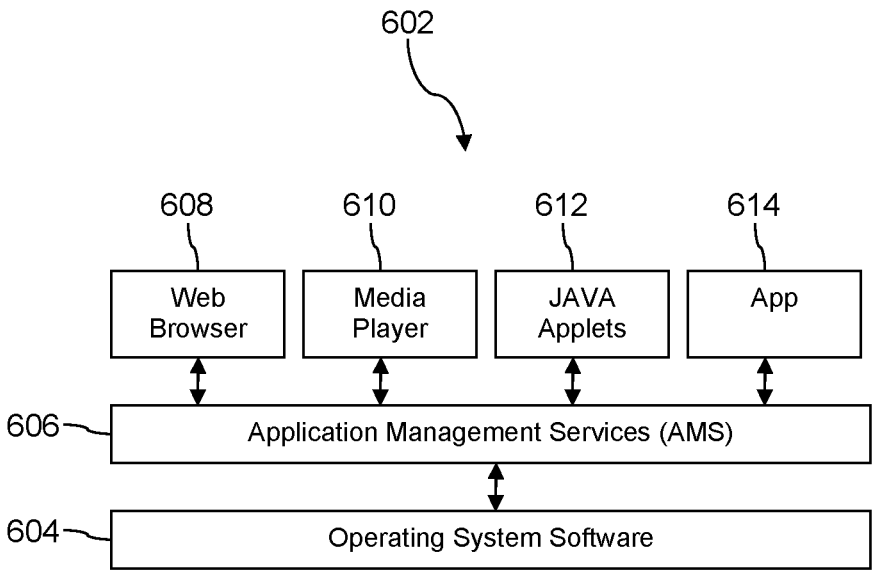
FIG. 8A is a block diagram of a software architecture according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
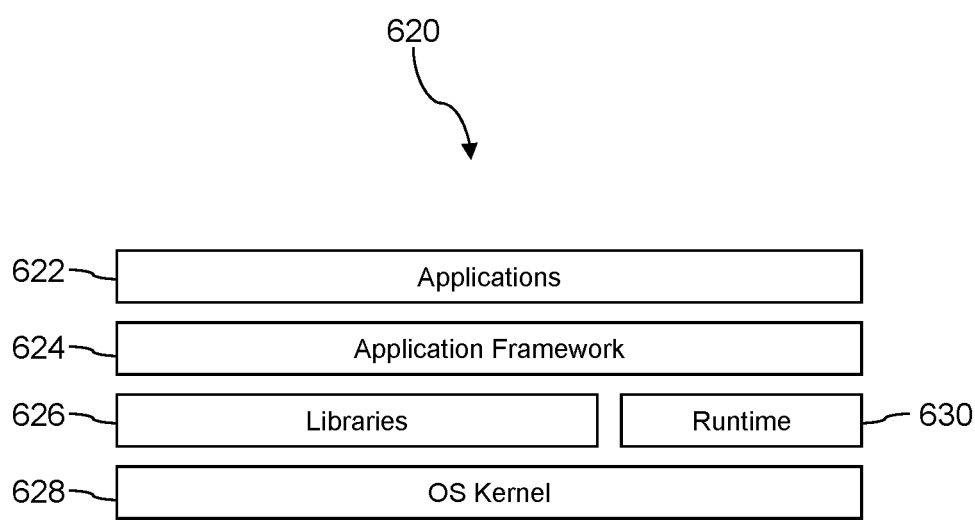
FIG. 8B is a block diagram of another software architecture according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
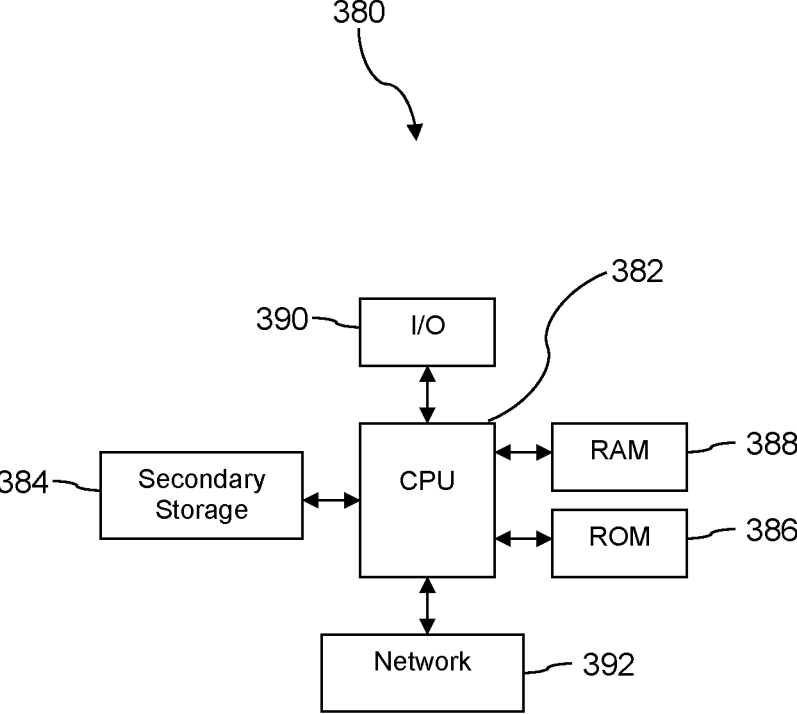
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of storing and managing access to information about electronic transactions completed by users collected from a plurality of transaction processors, comprising:

receiving transaction report messages by a transaction record repository application executing on a computer system, wherein each of the transaction report messages comprises an identity of a user, an identity of a transaction processor of the plurality of transaction processors, and information about an electronic transaction associated with the user;

storing the information associated with the transaction report messages by the transaction record repository application in an immutable datastore, wherein information associated with different users is stored in different chains of blocks in the immutable datastore;

receiving a first user information management request message by the transaction record repository application from a user;

responsive to receiving the first user information management request message, sending a user information management report by the transaction record repository application to the user, where the user information management report identifies one or more transaction processors of the plurality of transaction processors that have provided transaction report messages identifying the user and for each of the identified one or more transaction processors one or more types of information on electronic transactions provided by the transaction processor;

receiving a second user information management request message by the transaction record repository application from the user; and responsive to receiving the second user information management request message, restricting access by the transaction record repository application to one or more of the types of information on electronic transactions associated with the user that can be accessed by at least one transaction processor of the plurality of transaction processors.

2. The method of claim 1, wherein the electronic transactions completed by users are completed via user equipment (UEs).

3. The method of claim 1, wherein at least one transaction processor of the plurality of transaction processors is associated with a content web site.

4. The method of claim 1, wherein at least one transaction processor of the plurality of transaction processors is associated with an electronic retail sales web site.

5. The method of claim 1, wherein at least one transaction processor of the plurality of transaction processors is associated with a gaming web site.

6. The method of claim 1, wherein at least some of the transaction report messages comprise information about how a user navigated to a web site.

7. The method of claim 1, wherein at least some of the transaction report messages comprise information about a product or a service category.

8. The method of claim 1, wherein the immutable datastore comprises a chain of user blocks and a plurality of user electronic transaction chains, wherein each user block has a content that comprises a reference to an initial block of one of the user electronic transaction chains, and wherein each user electronic transaction chain comprises one or more user electronic transaction blocks associated with a user identified in the user block that references the electronic transaction chain.

9. The method of claim 8, wherein at least some of the user electronic transaction blocks comprise one or more of information about a date and time of an electronic transaction, information identifying an expenditure amount or value range, information about a product or a service category, or information about how a user navigated to a web site.

10. The method of claim 1, wherein the access restriction is based on user information access rules defined by the user, and wherein the user information access rules comprises at least one of:

a first user transaction information access rule that allows more than one of the plurality of transaction processors to access at least one type of information on electronic transactions associated with the user, or a second user transaction information access rule that defines an information age restriction such that information subject to the second user transaction information access rule is forbidden to access information of a user electronic transaction block after the user electronic transaction block exceeds an age threshold.

11. A system for storing and managing access to information about electronic transactions completed by users collected from a plurality of transaction processors, comprising:

a processor;

a non-transitory memory;

an immutable datastore; and a transaction record repository application stored in the non-transitory memory that, when executed by the processor:

receives transaction report messages, wherein each of the transaction report messages comprises an identity of a user, an identity of a transaction processor of the plurality of transaction processors, and information about an electronic transaction associated with the user;

stores the information associated with the transaction report messages in the immutable datastore, wherein information associated with different users is stored in different chains of blocks in the immutable datastore;

receives a first user information management request message from a user;

responsive to receiving the first user information management request message, sends a user information management report to the user, where the user information management report identifies one or more transaction processors of the plurality of transaction processors that have provided transaction report messages identifying the user and for each of the identified one or more transaction processors one or more types of information on electronic transactions provided by the transaction processor;

receives a second user information management request message from the user; and responsive to receiving the second user information management request message, restricts access to one or more of the types of information on electronic transactions associated with the user that can be accessed by at least one transaction processor of the plurality of transaction processors.

12. The system of claim 11, wherein the electronic transactions completed by users are completed via user equipment (UEs).

13. The system of claim 11, wherein at least one transaction processor of the plurality of transaction processors is associated with a content web site.

14. The system of claim 11, wherein at least one transaction processor of the plurality of transaction processors is associated with an electronic retail sales web site.

15. The system of claim 11, wherein at least one transaction processor of the plurality of transaction processors is associated with a gaming web site.

16. The system of claim 11, wherein at least some of the transaction report messages comprise information about how a user navigated to a web site.

17. The system of claim 11, wherein at least some of the transaction report messages comprise information about a product or a service category.

18. The system of claim 11, wherein the immutable datastore comprises a chain of user blocks and a plurality of user electronic transaction chains, wherein each user block has a content that comprises a reference to an initial block of one of the user electronic transaction chains, and wherein each user electronic transaction chain comprises one or more user electronic transaction blocks associated with a user identified in the user block that references the electronic transaction chain.

19. The system of claim 18, wherein at least some of the user electronic transaction blocks comprise one or more of information about a date and time of an electronic transaction, information identifying an expenditure amount or value range, information about a product or a service category, or information about how a user navigated to a web site.

20. The system of claim 11, wherein the access restriction is based on user information access rules defined by the user, and wherein the user information access rules comprises at least one of:

a first user transaction information access rule that allows more than one of the plurality of transaction processors to access at least one type of information on electronic transactions associated with the user, or a second user transaction information access rule that defines an information age restriction such that information subject to the second user transaction information access rule is forbidden to access information of a user electronic transaction block after the user electronic transaction block exceeds an age threshold.

* * * * *